United States Patent
Hallack et al.

(10) Patent No.: US 10,505,301 B2
(45) Date of Patent: Dec. 10, 2019

(54) CONDUCTIVE CONNECTION DEVICE FOR VEHICLE DISPLAY

(71) Applicant: Gentex Corporation, Zeeland, MI (US)

(72) Inventors: Jason D. Hallack, Allendale, MI (US); Andrew J. LeVesque, Holland, MI (US); John B. Wallace, West Olive, MI (US)

(73) Assignee: GENTEX CORPORATION, Zeeland, MI (US)

( * ) Notice: Subject to any disclaimer, the term of this patent is extended or adjusted under 35 U.S.C. 154(b) by 228 days.

(21) Appl. No.: 15/363,275

(22) Filed: Nov. 29, 2016

(65) Prior Publication Data

US 2017/0162965 A1 Jun. 8, 2017

Related U.S. Application Data (60) Provisional application No. 62/262,562, filed on Dec. 3, 2015.

(51) Int. Cl.
*B60R 1/12* (2006.01)
*H01R 12/73* (2011.01)
(Continued)

(52) U.S. Cl.
CPC .............. *H01R 12/737* (2013.01); *B60R 1/12* (2013.01); *B60R 16/03* (2013.01); *H01R 12/707* (2013.01);
(Continued)

(58) Field of Classification Search
CPC ............... H01R 12/737; H01R 12/707; H01R 12/7076; H01R 13/17; H01R 13/2471;
(Continued)

(56) References Cited

U.S. PATENT DOCUMENTS 5,669,698 A 9/1997 Veldman et al.
5,928,572 A 7/1999 Tonar et al.
(Continued)

FOREIGN PATENT DOCUMENTS

EP 2463963 A1 6/2012
JP H02285212 A 11/1990
(Continued)

OTHER PUBLICATIONS

International Search Report and Written Opinion of the International Searching Authority, or the Declaration, dated Apr. 6, 2017, for International Application No. PCT/US2016/063971, filed Nov. 29, 2016, 8 pages.

*Primary Examiner* — Steven T Sawyer
(74) *Attorney, Agent, or Firm* — Price Heneveld LLP; Bradley D. Johnson (57) ABSTRACT

The disclosure provides for a conductive connector device. The device is configured for communicating a control signal of an electro-optic element for a vehicular display device. The device comprises a spring assembly and a body having a connecting feature. The spring assembly comprises a spring and a conductive pin. The body forms an internal passage configured to at least partially house the spring assembly. A connecting feature is in connection with the body. The connecting feature is configured to engage an aperture of a circuit board configured to communicate a control signal to the electro-optic element. The engagement of the connecting feature to the aperture is configured to receive at least a portion of a force from the spring in a compressed arrangement.

13 Claims, 4 Drawing Sheets

(51) Int. Cl.
  *B60R 16/03* (2006.01)
  *H01R 12/70* (2011.01)
  *H01R 13/17* (2006.01)
  *H01R 13/24* (2006.01)

(52) U.S. Cl.
  CPC ......... *H01R 12/7076* (2013.01); *H01R 13/17* (2013.01); *H01R 13/2471* (2013.01); *B60R 2001/1215* (2013.01); *B60R 2001/1253* (2013.01); *H01R 13/2421* (2013.01)

(58) Field of Classification Search
  CPC ....... H01R 13/2421; B60R 1/12; B60R 16/03; B60R 2001/1215; B60R 2001/1253; B60R 1/088; B60R 1/04; B60R 1/00–2001/1292; H05K 7/183; H05K 7/184; H05K 7/182; G02F 1/15–2001/1635
  USPC .......... 361/809, 810; 359/265–275, 838–884
  See application file for complete search history.

(56) References Cited

U.S. PATENT DOCUMENTS

| | | | |
|---|---|---|---|
| 5,998,617 | A | 12/1999 | Srinivasa et al. |
| 6,020,987 | A | 2/2000 | Baumann et al. |
| 6,037,471 | A | 3/2000 | Srinivasa et al. |
| 6,137,620 | A | 10/2000 | Guarr et al. |
| 6,141,137 | A | 10/2000 | Byker et al. |
| 6,193,912 | B1 | 2/2001 | Thieste et al. |
| 6,241,916 | B1 | 6/2001 | Claussen et al. |
| 6,249,369 | B1 | 6/2001 | Theiste et al. |
| 6,340,320 | B1 | 1/2002 | Ogawa |
| 6,519,072 | B2 | 2/2003 | Nishikitani et al. |
| 7,527,403 | B2 | 5/2009 | Uken |
| 7,791,814 | B2 | 9/2010 | Liogier D'ardhuy et al. |
| 8,201,800 | B2 | 6/2012 | Filipiak |
| 8,210,695 | B2 | 7/2012 | Roth et al. |
| 8,264,761 | B2 | 9/2012 | Cammenga et al. |
| 8,643,931 | B2 | 2/2014 | Cammenga et al. |
| 8,646,924 | B2 | 2/2014 | Roth et al. |
| 8,814,373 | B2 | 8/2014 | Steel et al. |
| 8,827,517 | B2 | 9/2014 | Cammenga et al. |
| 8,922,901 | B2 | 12/2014 | Karam et al. |
| 8,960,629 | B2 | 2/2015 | Rizk et al. |
| 9,201,174 | B2 | 12/2015 | Karam et al. |
| 9,244,249 | B2 | 1/2016 | Kim et al. |
| 9,316,347 | B2 | 4/2016 | Roth |
| 2004/0140821 | A1* | 7/2004 | Lee .................... G01R 1/07314 324/754.14 |
| 2012/0327234 | A1 | 12/2012 | Fish, Jr. et al. |
| 2013/0062497 | A1 | 3/2013 | Van Huis et al. |
| 2013/0112679 | A1* | 5/2013 | Van Wyhe ............. H05B 3/845 219/202 |
| 2013/0170013 | A1 | 7/2013 | Tonar et al. |
| 2013/0194650 | A1* | 8/2013 | Roth ........................ B60R 1/02 359/267 |
| 2014/0063630 | A1 | 3/2014 | Busscher et al. |
| 2014/0160681 | A1 | 6/2014 | Chen |
| 2015/0070779 | A1 | 3/2015 | Karam et al. |
| 2015/0124094 | A1 | 5/2015 | Loong et al. |
| 2015/0297341 | A1 | 10/2015 | Noroozi et al. |
| 2016/0243987 | A1* | 8/2016 | Kendall .................... B60R 1/04 |
| 2016/0276630 | A1* | 9/2016 | Farrnbacher ............ H01L 24/72 |

FOREIGN PATENT DOCUMENTS

| | | |
|---|---|---|
| JP | H0521848 A | 1/1993 |
| JP | 2000182701 A | 6/2000 |
| JP | 2002189206 A | 7/2002 |
| JP | 2015516917 A | 6/2015 |
| KR | 1020120063625 A | 6/2012 |
| WO | 199842796 A1 | 10/1998 |
| WO | 199902621 A1 | 1/1999 |
| WO | 2012006422 A1 | 1/2012 |

* cited by examiner

CONDUCTIVE CONNECTION DEVICE FOR VEHICLE DISPLAY

CROSS-REFERENCE TO RELATED APPLICATION

This application claims benefit to U.S. Provisional Application No. 62/262,562, filed on Dec. 3, 2015, entitled "CONDUCTIVE CONNECTION DEVICE FOR VEHICLE DISPLAY," the disclosure of which is hereby incorporated herein by reference in its entirety.

BACKGROUND OF THE INVENTION

The present invention generally relates to a conductive connection device and more particularly relates to conductive connection device comprising a spring assembly.

SUMMARY OF THE INVENTION

In one aspect, the disclosure provides for a conductive connector device. The device is configured for communicating a control signal of an electro-optic element for a vehicular display device. The device comprises a spring assembly and a body having a connecting feature. The spring assembly comprises a spring and a conductive pin. The body forms an internal passage configured to at least partially house the spring assembly. A connecting feature is in connection with the body. The connecting feature is configured to engage an aperture of a circuit board configured to communicate a control signal to the electro-optic element. The engagement of the connecting feature to the aperture is configured to receive at least a portion of a force from the spring in a compressed arrangement.

In another aspect, the disclosure provides for a vehicular display assembly. The assembly comprises a first PCB disposed on a first side of a display module, a second PCB comprising a surface arranged substantially perpendicular to the first PCB, and an electro-optic device disposed on a second side of the display module. The assembly further comprises a conductive connector device in connection with the surface of the second PCB. The conductive connector device comprises a spring assembly comprising a spring and a conductive pin. The conductive connector device further comprises a body forming an internal passage configured to at least partially house the spring assembly. The conductive pin is configured to communicatively connect the second PCB to the electro-optic device.

In yet another aspect, the disclosure provides for a vehicular display assembly. The assembly comprises a first PCB disposed on a first side of a display module, a second PCB comprising a surface arranged substantially perpendicular to the first PCB, and an electro-optic device disposed on a second side of the display module. The assembly further comprises a conductive connector device in connection with the surface of the second PCB. The conductive connector device comprises a spring assembly comprising a spring and a conductive pin. The conductive connector device further comprises a body forming an internal passage configured to at least partially house the spring assembly. The body comprises a connecting feature configured to engage the second PCB thereby resisting a force applied by the spring assembly. The conductive pin is configured to communicatively connect the second PCB to the electro-optic device.

These and other features, advantages, and objects of the present invention will be further understood and appreciated by those skilled in the art by reference to the following specification, claims, and appended drawings.

DETAILED DESCRIPTION

Figure 1:
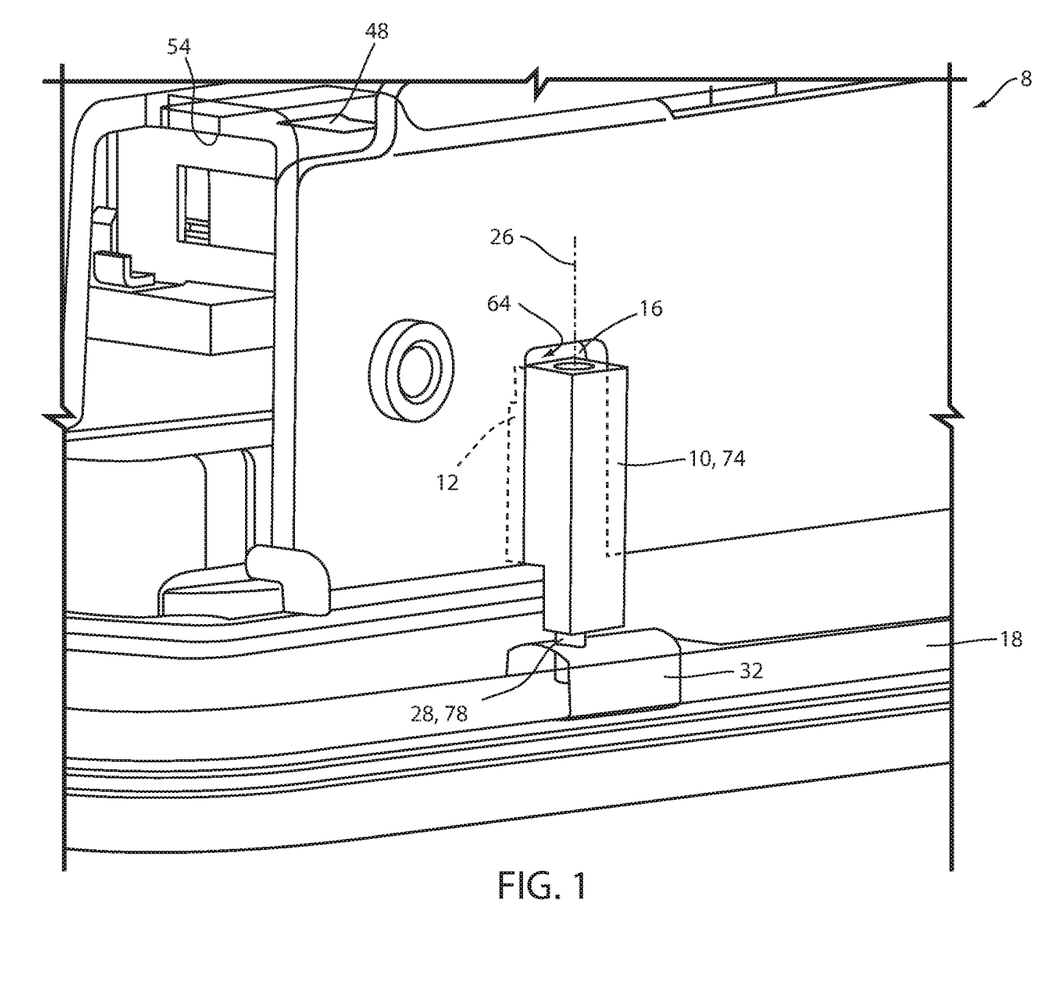
FIG. 1 is a pictorial view of a display mirror assembly demonstrating a spring clip.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of the display mirror, and the term "rear" shall refer to the surface of the element further from the intended viewer of the display mirror. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIG. 1, the disclosure provides for a display mirror assembly 8 comprising a spring pin 10 having a connecting feature 12. The connecting feature 12 is configured to provide for an electrical connection between a printed circuit board (PCB) and an electronic component. In a particular embodiment, the disclosure provides for the spring pin 10 configured to mechanically and electrically connect to a secondary PCB 16. The spring pin 10 may provide for electrical communication from the secondary PCB 16 to a partially transmissive element. The partially transmissive element may correspond to an electro-optic or electrochromic (EC) element 18. In such embodiments, the secondary PCB 16 may comprise an EC element drive configured to control a level of light transmission through the EC element 18.

The spring pin 10 may be configured to mount to a first surface 20 of the secondary PCB 16. In some embodiments, the spring pin 10 may comprise a connecting feature 12 configured to engage a post aperture 24 formed by the secondary PCB 16. The spring pin 10 may be configured to connect to the first surface 20 of the secondary PCB 16 and provide for electrical communication from the secondary PCB 16 to the EC element 18. In such configurations, the longitudinal axis 26 of the spring pin 10 may be arranged perpendicular to a normal vector extending from the first surface 20. In this arrangement, the connecting feature 12 may provide for the spring pin 10 to apply a force along the longitudinal axis 26 from a contact 28 compressed to ensure consistent conductive communication with the EC element 18.

In the mounted configuration, the longitudinal axis 26 of the spring pin 10 may extend parallel to the first surface 20 such that the contact 28 extends outward from a perimeter edge 30 of the secondary PCB 16. The contact 28 may compressively engage a j-clip 32 of the EC element 18. The j-clip 32 may be in conductive communication with the EC element 18. In this configuration, the connecting feature 12 may provide for the spring pin 10 to mechanically engage the first surface 20 of the secondary PCB 16 such that a load applied by a spring mechanism 34 of the spring pin 10 is supported at least partially via the engagement of the connecting feature 12 to the post aperture 24.

Figure 2:
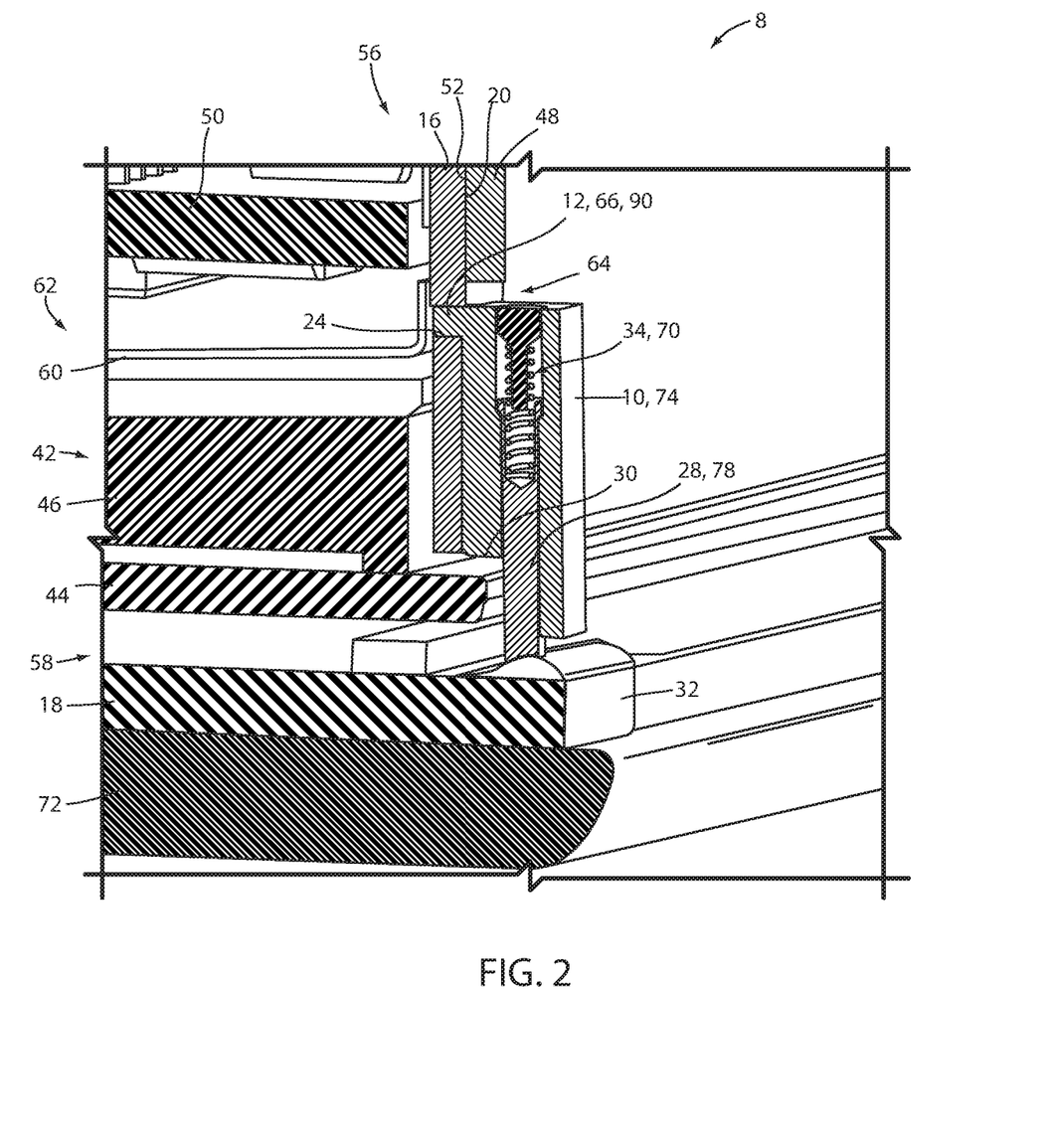
FIG. 2 is a cross-sectional pictorial view of a display mirror assembly demonstrating a spring clip.

FIG. 2 demonstrates a cross-sectional view sectioned along line 1-1. Referring now to FIGS. 1 and 2, the display mirror assembly 8 is discussed according to an exemplary embodiment. The display mirror assembly 8 may comprise a display module 42 that may be viewed through a partially transmissive element (e.g. the EC element 18). The display mirror assembly 10 generally includes several components including a display 44, an optic block 46, a support bracket 48, and a primary PCB 50. A housing may be configured to at least partially receive the display module 42. The display mirror assembly 8 may further include a mounting member adapted for mounting on a windshield of a vehicle.

The secondary PCB 16 may be mounted to a second surface 52 of the support bracket 48 and be conductively connected to the primary PCB 50. The support bracket 48 may significantly form an 'L' shape such that a third surface 54 of the support bracket 48 may further provide for a mounting surface for the primary PCB 50. In this configuration, the relative orientation of the primary PCB 50 to the secondary PCB 16 may be substantially perpendicular. The primary PCB 50 as well as various components in connection therewith may be connected to the support bracket 48. The support bracket 48 may correspond to a structural support and/or heat sink configured to provide a stable mounting surface for various components of the display mirror assembly 8.

Still referring to FIGS. 1 and 2, the secondary PCB may further correspond to an edge-lit PCB 56. The edge-lit PCB 56 may comprise a plurality of light emitting diodes (LEDs) configured to illuminate the optic block 46 of the display 44. The orientation of the optic block 46 and the display 44 may be configured to project image data for display on the display 44. As such, the display 44 is in communication with the primary PCB 50 and configured to receive video data, which may be demonstrated thereon. While this configuration may allow for visual information to be shown on a screen 58 of the display 44, the arrangement limits access for connections from the primary PCB 50 to the EC element 18.

In various embodiments, the display mirror assembly 8 may further comprise an intermediate shield 60. The intermediate shield 60 may be disposed proximate and substantially parallel to the primary PCB 50. The assembled configuration of the intermediate shield 60, the primary PCB 50, and the support bracket 48 may be referred to as a stacked sub-assembly 62. The stacked sub-assembly 62 may be assembled efficiently held together by various fasteners. The fasteners may be of conductive material configured to ground at least one of the intermediate shield 60 and the primary PCB 50 to the support bracket 48. In this configuration, each of the support bracket 48 and the intermediate shield 60 may be of substantially heat conductive and electrically conductive materials that may further provide structural support for the stacked sub-assembly 62.

In the assembled configuration, the secondary PCB 16 is mounted to the second surface 52 of the support bracket 48. As previously discussed, the spring pin 10 may be configured to connect to the first surface 20 of the secondary PCB 16 and provide for electrical communication from the secondary PCB 16 to the EC element 18. The connecting feature 12 may provide for the spring pin 10 to apply a force along the longitudinal axis 26 from a contact 28 compressed to ensure consistent conductive communication with the EC element 18. The spring pin 10 may extend through an access aperture 64 formed in the support bracket 48. In this configuration, the secondary PCB 16 may be connected to the support bracket 48 while providing for the spring pin 10 to extend outward through the access aperture 64 providing for communication with the EC element 18.

The connecting feature 12 of the spring pin 10 may correspond to a post 66 configured to interact with the post aperture 24. The spring pin 10 may comprise a mounting surface 68 adjacent the connecting feature 12. The mounting surface 68 and the connecting feature 12 may be configured to be soldered to a mounting portion or pad of the first surface 20. The solder connection between the first surface 20 and mounting portion may result in a shear force to be applied along the longitudinal axis 26 due to the spring force. The connecting feature 12 may limit or minimize any creep in the solder connection that may result due to the pressure of a spring assembly 70 applied to the j-clip 32. In this configuration, the conductive connection from the secondary PCB 16 to the EC element 18 is maintained via the spring pin 10 in a configuration that may provide for a robust connection between the secondary PCB 16 and the EC element 18.

The screen 58 may comprise a glass element 72, which may be generally planar, with an outer perimeter and a border around the outer perimeter. The border may incorporate a chrome ring or other similar finish to conceal a front shield and other elements located behind the glass element 72 in the display mirror assembly 8. For example, the border may be configured to conceal a seal on an electrochromic unit, an applique, foam adhesive, and/or pad printing. The border may extend from the outer perimeter of the glass element to an outer edge of the display 44. Alternatively, the border may be narrower and not reach from the outer perimeter to the outer edge of the display 44 along at least some portions of the border. The perimeter of the glass element 72 may also have a ground edge, a beveled edge, or be frameless.

The glass element 72 may comprise the EC element 18 and/or an element such as a prism. One non-limiting example of an EC element 18 or an electro-optic element is an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "Electrochromic Layer And Devices Comprising Same," U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," U.S. Pat. No. 6,141,137 entitled "Electrochromic Media For Producing A Pre-selected Color," U.S. Pat. No. 6,241,916 entitled "Electrochromic System," U.S. Pat. No. 6,193,912 entitled "Near Infrared-Absorbing Electrochromic Compounds And Devices Comprising Same," U.S. Pat. No. 6,249,369 entitled "Coupled Electrochromic Compounds With Photostable Dication Oxidation States," and U.S. Pat. No. 6,137,620 entitled "Electrochromic Media With Concentration Enhanced Stability, Process For The Preparation Thereof and Use In Electrochromic Devices"; U.S. Pat. No. 6,519,072, entitled "Electrochromic Device"; and International Patent Application Serial Nos. PCT/US98/05570 entitled "Electrochromic Polymeric Solid Films, Manufacturing Electrochromic Devices Using Such Solid Films, And Processes For Making Such Solid Films And Devices," PCT/EP98/03862 entitled "Electrochromic Polymer System," and PCT/US98/05570 entitled "Electrochromic Polymeric Solid Films, Manufacturing Electrochromic Devices Using Such Solid Films, And Processes For Making Such Solid Films And Devices," which are herein incorporated by reference in their entirety.

The glass element 72 may also be any other element having partially reflective, partially transmissive properties. To provide electric current to the glass element 72, electrical elements are provided on opposing sides of the element, to generate an electrical potential therebetween. The display 44 is generally planar, with the outer edge defining a front surface 72. The display 44 may be LCD, LED, OLED, plasma, DLP or other display technology. The display 44 further includes a flexible electrical connector, which is mechanically and electrically connected with the primary PCB 50.

Figure 3:
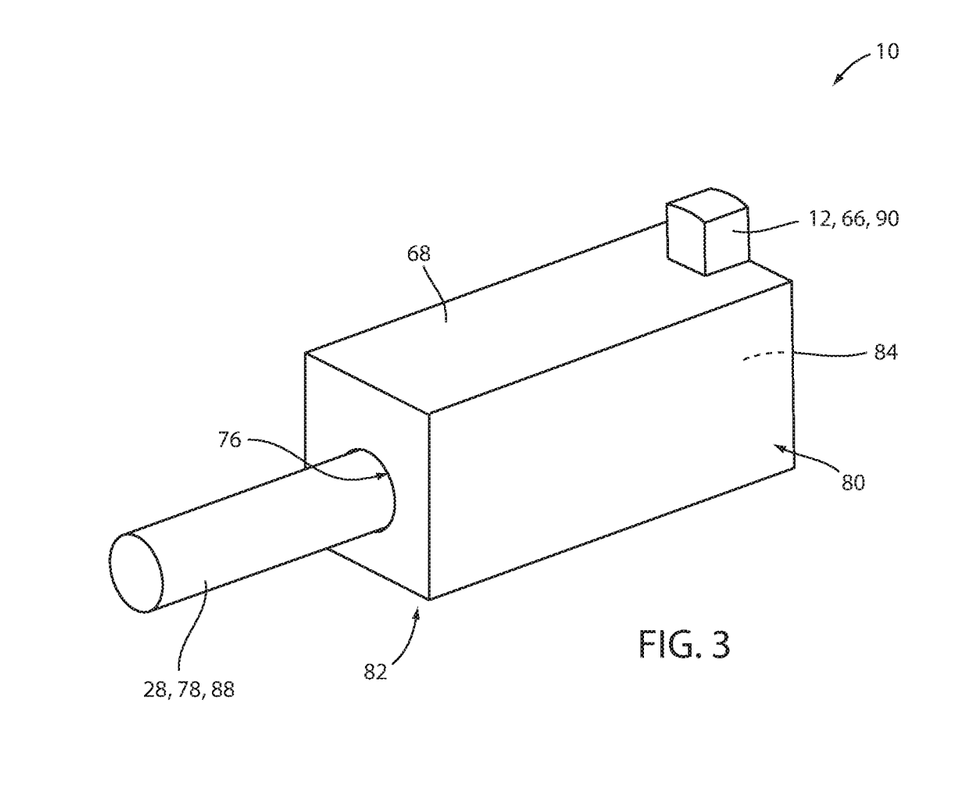
FIG. 3 is a pictorial view of a spring clip.
Figure 4A:
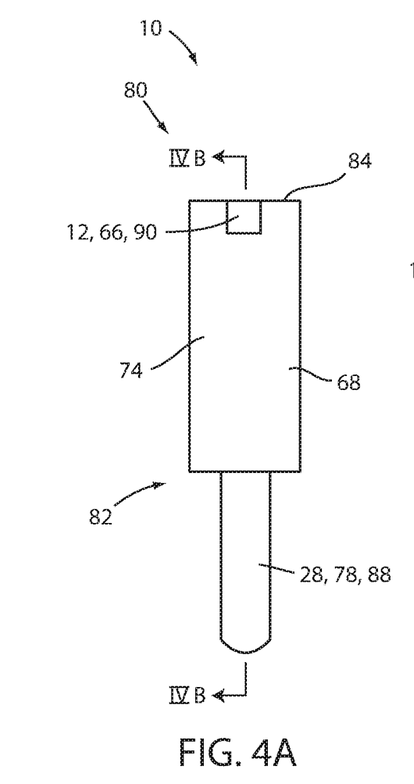
FIG. 4A is an orthographic projection of the spring clip demonstrated in FIG. 3.
Figure 4B:
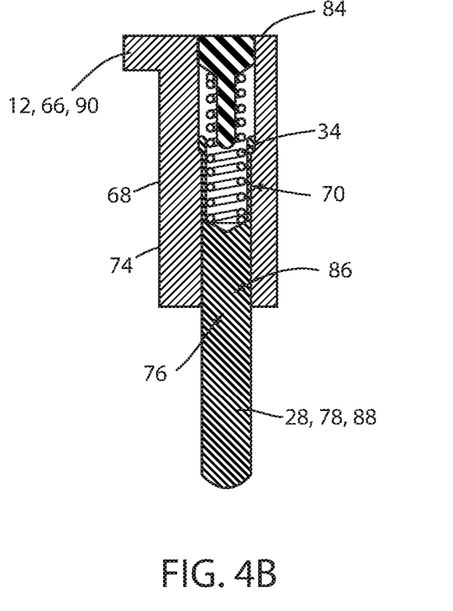
FIG. 4B is a cross-sectional view along section IV-IV demonstrated in FIG. 4A.
Figure 4C:
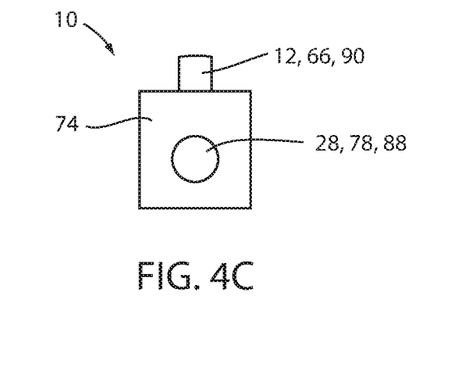
FIG. 4C is an orthographic projection of the spring clip demonstrated in FIG. 3 in accordance with the disclosure.

Referring now to FIGS. 3 and 4, detailed views of the spring pin 10 are shown demonstrating a body 74 configured to house the spring assembly 70. The body 74 is further configured to slidably engage the contact 28 about an opening 76 formed by the body. The opening 76 may correspond to a cylindrical opening configured to slidably engage the contact 28. In this configuration, the contact 28 may correspond to a cylinder 78 configured to compress the spring assembly 70 such that consistent pressure may be maintained from the secondary PCB 16 to the j-clip 32 of the EC element 18. The spring pin 10 may provide for a simple and robust assembly to connect the secondary PCB 16 to the EC element 18.

The post 66 of the connecting feature 12 may be configured to extend outward from the mounting surface 68 to interact with the post aperture 24. The mounting surface 68 and the connecting feature 12 may be configured to be soldered to a mounting portion or pad of the first surface 20 of the secondary PCB 16. The solder connection between the first surface 20 and mounting portion may result in a shear force to be applied along the longitudinal axis 26. The connecting feature 12 may limit or minimize any creep in the solder connection that may result due to the pressure of a spring assembly 70 applied to the j-clip 32. In this configuration, the conductive connection from the secondary PCB 16 to the EC element 18 is maintained via the spring pin 10 in a configuration that may provide for a robust connection between the secondary PCB 16 and the EC element 18.

The body 74 of the spring pin 10 may be substantially rectangular in shape and form an internal passage 86 corresponding to the opening 76. Though discussed as corresponding to a rectangular shape, the shape of the body 74 may vary without departing from the spirit of the disclosure. The internal passage 86 may be configured to house the spring assembly 70 and the contact 28, which may be in the form of a pin 88 of conductive material. The body 74 and the pin 88 may be coated and/or plated in various conductive materials, for example silver or gold. In this configuration, current or signals from the EC element drive may be communicated from the secondary PCB 16 to the EC element 18. As such, the spring pin 10 may be operable to transmit control signals from the secondary PCB 16 to control the EC element 18.

As discussed herein, the spring pin 10 may comprise a connecting feature 12 configured to engage the post aperture 24 formed by the secondary PCB 16. The connecting feature 12 may form a protrusion 90 formed from or connected to the mounting surface 68 of the body 74. In such configurations, the spring pin 10 may be configured to connect to the first surface 20 of the secondary PCB 16 and provide for electrical communication from the secondary PCB 16 to the EC element 18.

The body 74 of the spring pin 10 may form a proximal end portion 80 and a distal end portion 82. The cylinder 78 may extend from the distal end portion 82 and the connecting feature 12 may extend from the body 74 proximate the proximal end portion 80. For example, in an exemplary embodiment, the connecting feature 12 may extend from the mounting surface 68 along a proximal surface 84. In some embodiments, the connecting feature 12 may extend from the body 74 co-planar to the proximal surface. 84. In such embodiments, the post 66 may form a portion of the proximal surface 84.

The present disclosure may be used with a mounting system such as that described in U.S. Pat. Nos. 8,814,373; 8,201,800; 8,210,695; 9,174,577; 8,925,891; and 9,838,653; and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. Nos. 8,814,373; 8,646,924; 8,643,931; 8,264,761; and 8,885,240; and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

It will be appreciated that embodiments of the invention described herein may be comprised of one or more conventional processors and unique stored program instructions that control one or more processors to implement, in conjunction with certain non-processor circuits, some, most, or all of the functions of a display mirror assembly 8, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicular display assembly comprising:
a first PCB disposed on a first side of a display module;
a second PCB comprising a surface arranged substantially perpendicular to the first PCB;
an electro-optic device disposed on a second side of the display module;
a conductive connector device in connection with the surface of the second PCB and comprising:
a spring assembly comprising a spring and a conductive pin; and
a body forming an internal passage configured to at least partially house the spring assembly, wherein the conductive pin is configured to communicatively connect the second PCB to the electro-optic device.

2. The display according to claim 1, wherein the conductive pin extends outward from the internal passage parallel to the surface of the second PCB.

3. The display according to claim 2, wherein the conductive pin extends outward beyond a perimeter edge of the second PCB.

4. The display according to claim 3, wherein the conductive pin extends to the electro-optic device to provide for the communicative connection.

5. The display according to claim 1, wherein the body further comprises a connecting feature configured to resist a force applied by the spring assembly.

6. The display according to claim 5, wherein the force extends from the spring assembly and maintains a connecting force between the conductive pin and the electro-optic device.

7. The display according to claim 5, wherein the secondary PCB forms an aperture configured to receive the connecting feature.

8. The display according to claim 1, wherein the first PCB is arranged substantially parallel to a display surface of the display module.

9. The display according to claim 1, wherein the second PCB corresponds to an edge-lit PCB.

10. The display according to claim 5, wherein the edge-lit PCB is configured to illuminate the display module.

11. A vehicular display mirror assembly comprising:
a first PCB disposed on a first side of a display module;
a second PCB comprising a surface arranged substantially perpendicular to the first PCB;
an electro-optic device disposed on a second side of the display module;
a conductive connector device in connection with the surface of the second PCB and comprising:
a spring assembly comprising a spring and a conductive pin;
a body forming an internal passage configured to at least partially house the spring assembly, the body comprising a connecting feature configured to engage the second PCB thereby resisting a force applied by the spring assembly, wherein the conductive pin is configured to communicatively connect the second PCB to the electro-optic device.

12. The assembly according to claim 11, wherein the force extends from the spring assembly and maintains a connecting force between the conductive pin and the electro-optic device.

13. The assembly according to claim 11, wherein the body comprises a mounting surface configured to form a soldered connection with the surface.

* * * * *